(12) United States Patent
Su et al.

(10) Patent No.: US 11,375,479 B2
(45) Date of Patent: Jun. 28, 2022

(54) DATA TRANSMISSION METHOD, COMMUNICATIONS DEVICE, AND NETWORK DEVICE

(71) Applicant: Huawei Technologies Co., Ltd., Shenzhen (CN)

(72) Inventors: Hongjia Su, Shanghai (CN); Zhengzheng Xiang, Shanghai (CN); Lei Lu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 50 days.

(21) Appl. No.: 16/914,113

(22) Filed: Jun. 26, 2020

(65) Prior Publication Data

US 2020/0329469 A1 Oct. 15, 2020

Related U.S. Application Data

(63) Continuation of application No. PCT/CN2018/117777, filed on Nov. 28, 2018.

(30) Foreign Application Priority Data

Dec. 27, 2017 (CN) .......................... 201711451076.6

(51) Int. Cl.
 *H04W 4/00* (2018.01)
 *H04W 72/04* (2009.01)
 *H04W 4/40* (2018.01)

(52) U.S. Cl.
 CPC ......... *H04W 72/0406* (2013.01); *H04W 4/40* (2018.02)

(58) Field of Classification Search
 USPC .... 370/229, 230, 236, 252, 230.1, 328, 329, 370/330, 395.2, 395.21, 395.4, 468, 496,
 (Continued)

(56) References Cited

U.S. PATENT DOCUMENTS

2015/0009939 A1 1/2015 Zhang et al.
2017/0325226 A1* 11/2017 Yoon ..................... H04W 76/14
(Continued)

FOREIGN PATENT DOCUMENTS

CN 104202740 A 12/2014
CN 106165325 A 11/2016
(Continued)

OTHER PUBLICATIONS

"Monitoring of DL control channel for NR," 3GPP TSG RAN WG1 Meeting #87, Reno, USA, R1-1612716, pp. 1-5, 3rd Generation Partnership Project, Valbonne, France (Nov. 14-18, 2016).
(Continued)

*Primary Examiner* — Nguyen H Ngo

(74) *Attorney, Agent, or Firm* — Leydig, Voit & Mayer, Ltd.

(57) ABSTRACT

A data transmission method, a communications device, a network device, and a system are provided, applicable to Internet of Vehicles, self-driving, or, for example, V2X, V2V, LTE-V, and eV2X. The sending method includes: sending, by a first communications device, first indication information to a second communications device on a first resource, where the first indication information is used to indicate a location relationship between a resource on which the first communications device sends control information and a resource on which the first communications device sends data, and the location relationship is a frequency division multiplexing relationship or a time division multiplexing relationship; sending, by the first communications device, the control information to the second communications device on the first resource; and sending, by the first communications device based on the control information, the data to the second communications device on the first resource.

18 Claims, 9 Drawing Sheets

(58) Field of Classification Search
USPC .......................................................... 370/522
See application file for complete search history.

(56) References Cited

U.S. PATENT DOCUMENTS

| | | | | |
|---|---|---|---|---|
| 2018/0206264 | A1* | 7/2018 | Li | H04W 72/1242 |
| 2018/0338319 | A1* | 11/2018 | Kim | H04L 27/2678 |
| 2020/0029319 | A1* | 1/2020 | Huang | H04L 5/0053 |
| 2020/0137773 | A1* | 4/2020 | Tang | H04W 76/14 |

FOREIGN PATENT DOCUMENTS

| | | | |
|---|---|---|---|
| CN | 106256163 | A | 12/2016 |
| CN | 106658716 | A | 5/2017 |
| CN | 106792885 | A | 5/2017 |
| CN | 106911600 | A | 6/2017 |
| CN | 107040997 | A | 8/2017 |
| CN | 107295681 | A | 10/2017 |
| CN | 107371258 | A | 11/2017 |
| WO | 2017004536 | A1 | 1/2017 |
| WO | 2017049976 | A1 | 3/2017 |
| WO | 2017051863 | A1 | 3/2017 |
| WO | 2017052458 | A1 | 3/2017 |
| WO | 2017106025 | A1 | 6/2017 |

OTHER PUBLICATIONS

"D2D Communication Resource Scheduling," 3GPP TSG-RAN WG1 Meeting #76, Prague, Czech Republic, R1-140589, Total 5 pages, 3rd Generation Partnership Project, Valbonne, France (Feb. 10-14, 2014).

"D2D Resource Pool and Scheduling Assignments," 3GPP TSG-RAN WG1 Meeting #76bis, Shenzhen, China, R1-141571, Total 5 pages, 3rd Generation Partnership Project, Valbonne, France (Mar. 31-Apr. 4, 2014).

* cited by examiner

DATA TRANSMISSION METHOD, COMMUNICATIONS DEVICE, AND NETWORK DEVICE

CROSS-REFERENCE TO RELATED APPLICATIONS

This application is a continuation of International Application No. PCT/CN2018/117777, filed on Nov. 28, 2018, which claims priority to Chinese Patent Application No. 201711451076.6, filed on Dec. 27, 2017. The disclosures of the aforementioned applications are hereby incorporated by reference in their entireties.

TECHNICAL FIELD

Embodiments of this application relate to communications systems, and in particular, to a data transmission method, a communications device, and a network device.

BACKGROUND

Device-to-device (D2D) communication, vehicle-to-vehicle (V2V) communication, vehicle-to-pedestrian V2P (V2P) communication, or vehicle-to-infrastructure/network V2I/N (V2I/N) communication is a technology for direct communication between terminal devices. V2V, V2P, and V2I/N are collectively referred to as V2X, in other words, communication between vehicles and anything.

Using V2X communication as an example, a transmit end device periodically sends some information of the transmit end device, such a location, a speed, and intention information (e.g., information such as turning, merging, and reversing), to a device around the transmit end device, to improve vehicle driving safety. The transmit end device sends control information to the receive end device on a first resource, and the transmit end device sends data to the receive end device on a second resource based on the control information. The first resource and the second resource are in a form of frequency division multiplexing. The receive end device first receives and buffers the control information and the data, and then the receive end device decodes the control information and decodes, based on the correctly decoded control information, the buffered data. The location relationship between the resource used to transmit the control information and the resource used to transmit the data is pre-defined in a protocol, and therefore is relatively fixed. The transmit end device and the receive end device can transmit the control information and the data only on a resource pre-defined in the protocol. Therefore, an existing method for transmitting control information and data is not sufficiently flexible.

SUMMARY

Embodiments of this application provide a data transmission method, a communications device, and a network device, to transmit control information and data more flexibly.

According to a first aspect, a data sending method is provided, including: sending, by a first communications device, first indication information to a second communications device on a first resource, where the first indication information is used to indicate a location relationship between a resource on which the first communications device sends control information and a resource on which the first communications device sends data, and the location relationship is a frequency division multiplexing relationship or a time division multiplexing relationship; sending, by the first communications device, the control information to the second communications device on the first resource; and sending, by the first communications device based on the control information, the data to the second communications device on the first resource, where the location relationship between the resource on which the first communications device sends the control information to the second communications device and the resource on which the first communications device sends the data to the second communications device based on the control information meets the location relationship indicated by the first indication information.

According to this embodiment of this application, the first communications device notifies, by using the first indication information, the second communications device of the location relationship between the resource used to send the control information and the resource used to send the data, instead of transmitting the control information and the data in a fixed manner. After receiving the first indication information, the second communications device may receive, based on the location relationship that is indicated by the first indication information and that is between the resource used to send the control information and the resource used to send the data, the control information and the data sent by the first communications device, thereby improving flexibility of sending the control information and the data by the first communications device.

In a possible design, the sending, by a first communications device, first indication information to a second communications device on a first resource includes: sending, by the first communications device, the first indication information to the second communications device on a second resource included in the first resource, where the second resource is a resource that is of the first resource and that includes a first decodable symbol in time domain and a resource block RB with a smallest sequence number in frequency domain.

In a possible design, the first resource includes m symbols in time domain and p RBs in frequency domain, where m or p is a positive integer; and the second resource is the first decodable symbol in the m symbols in time domain, and the second resource is an RB with a smallest sequence number in the p RBs in frequency domain.

In a possible design, the first indication information indicates that the location relationship between the resource on which the first communications device sends the control information and the resource on which the first communications device sends the data is the frequency division multiplexing relationship; the sending, by the first communications device, the control information to the second communications device on the first resource includes: sending, by the first communications device, the control information to the second communications device on q RBs in the p RBs, where q is a positive integer; and the sending, by the first communications device based on the control information, the data to the second communications device on the first resource includes: sending, by the first communications device based on the control information, the data to the second communications device on remaining p-q RBs in the p RBs.

In a possible design, the q RBs are two RBs with smallest sequence numbers in the p RBs.

In a possible design, the first indication information indicates that the location relationship between the resource on which the first communications device sends the control information and the resource on which the first communications device sends the data is the time division multiplexing relationship; the sending, by the first communications device, the control information to the second communications device on the first resource includes: sending, by the first communications device, the control information to the second communications device on first r symbols in the m symbols, where r is a positive integer; and the sending, by the first communications device based on the control information, the data to the second communications device on the first resource includes: sending, by the first communications device based on the control information, the data to the second communications device on remaining m-r symbols in the m symbols.

In a possible design, the first communications device sends, based on the control information, the data to the second communications device on a first symbol set of the remaining m-r symbols in the m symbols, and the method further includes: receiving, by the first communications device based on the control information, the acknowledgment information from the second communications device on a second symbol set of the remaining m-r symbols in the m symbols, where the first symbol set and the second symbol set do not include a same symbol.

In a possible design, there is a guard interval between the first symbol set and the second symbol set, and the guard interval includes at least one symbol in time domain.

In a possible design, the sending, by the first communications device, the control information to the second communications device on first r symbols in the m symbols includes: sending, by the first communications device, the control information to the second communications device on a symbol in the first r symbols except the first symbol of the first r symbols; and the method further includes: sending, by the first communications device, automatic gain control AGC information to the second communications device on the first symbol of the first r symbols.

In a possible design, the first resource includes at least one first time-frequency resource element, the first time-frequency resource element includes the m symbols in time domain and n RBs in frequency domain, the first resource includes the m symbols in time domain, a quantity p of RBs included in the first resource in frequency domain is a positive integer multiple of n, and n is a positive integer.

According to a second aspect, a first communications device is provided. The first communications device includes at least: a sending unit, configured to send first indication information to a second communications device on a first resource, where the first indication information is used to indicate a location relationship between a resource on which the first communications device sends control information and a resource on which the first communications device sends data, and the location relationship is a frequency division multiplexing relationship or a time division multiplexing relationship, where the sending unit is further configured to send the control information to the second communications device on the first resource; and the sending unit is further configured to send the data to the second communications device on the first resource based on the control information, where the location relationship between the resource on which the first communications device sends the control information to the second communications device and the resource on which the first communications device sends the data to the second communications device based on the control information meets the location relationship indicated by the first indication information.

According to this embodiment of this application, the first communications device notifies, by using the first indication information, the second communications device of the location relationship between the resource used to send the control information and the resource used to send the data, instead of transmitting the control information and the data in a fixed manner. After receiving the first indication information, the second communications device may receive, based on the location relationship that is indicated by the first indication information and that is between the resource used to send the control information and the resource used to send the data, the control information and the data sent by the first communications device, thereby improving flexibility of sending the control information and the data by the first communications device.

In a possible design, the sending, by a sending unit, first indication information to a second communications device on a first resource includes: sending, by the sending unit, the first indication information to the second communications device on a second resource included in the first resource, where the second resource is a resource that is of the first resource and that includes a first decodable symbol in time domain and a resource block RB with a smallest sequence number in frequency domain.

In a possible design, the first resource includes m symbols in time domain and p RBs in frequency domain, where m or p is a positive integer; and the second resource is the first decodable symbol in the m symbols in time domain, and the second resource is an RB with a smallest sequence number in the p RBs in frequency domain.

In a possible design, the first indication information indicates that the location relationship between the resource on which the sending unit sends the control information and the resource on which the sending unit sends the data is the frequency division multiplexing relationship; the sending, by the sending unit, the control information to the second communications device on the first resource includes: sending, by the sending unit, the control information to the second communications device on q RBs in the p RBs, where q is a positive integer; and the sending, by the sending unit based on the control information, the data to the second communications device on the first resource includes: sending, by the sending unit based on the control information, the data to the second communications device on remaining p-q RBs in the p RBs.

In a possible design, the q RBs are two RBs with smallest sequence numbers in the p RBs.

In a possible design, the first indication information indicates that the location relationship between the resource on which the sending unit sends the control information and the resource on which the sending unit sends the data is the time division multiplexing relationship; the sending, by the sending unit, the control information to the second communications device on the first resource includes: sending, by the sending unit, the control information to the second communications device on first r symbols in the m symbols, where r is a positive integer; and the sending, by the sending unit based on the control information, the data to the second communications device on the first resource includes: sending, by the sending unit based on the control information, the data to the second communications device on remaining m-r symbols in the m symbols.

In a possible design, the sending unit sends, based on the control information, the data to the second communications device on a first symbol set of the remaining m-r symbols in the m symbols; and the first communications device further includes a receiving unit, and the receiving unit receives, based on the control information, the acknowledgment information from the second communications device on a second symbol set of the remaining m-r symbols in the m symbols, where the first symbol set and the second symbol set do not include a same symbol.

In a possible design, there is a guard interval between the first symbol set and the second symbol set, and the guard interval includes at least one symbol in time domain.

In a possible design, the sending, by the sending unit, the control information to the second communications device on first r symbols in the m symbols includes: sending, by the sending unit, the control information to the second communications device on a symbol in the first r symbols except the first symbol of the first r symbols; and the sending unit is further configured to send automatic gain control AGC information to the second communications device on the first symbol of the first r symbols.

In a possible design, the first resource includes at least one first time-frequency resource element, the first time-frequency resource element includes the m symbols in time domain and n RBs in frequency domain, the first resource includes the m symbols in time domain, a quantity p of RBs included in the first resource in frequency domain is a positive integer multiple of n, and n is a positive integer.

According to a third aspect, a data receiving method is provided, including: receiving, by a second communications device, first indication information from a first communications device on a first resource, where the first indication information is used to indicate a location relationship between a resource on which the first communications device sends control information and a resource on which the first communications device sends data, and the location relationship is a frequency division multiplexing relationship or a time division multiplexing relationship; receiving, by the second communications device, the control information from the first communications device on the first resource; and receiving, by the second communications device based on the control information, the data from the second communications device on the first resource, where the location relationship between the resource on which the first communications device sends the control information to the second communications device and the resource on which the first communications device sends the data to the second communications device based on the control information meets the location relationship indicated by the first indication information.

According to this embodiment of this application, the first communications device notifies, by using the first indication information, the second communications device of the location relationship between the resource used to send the control information and the resource used to send the data, instead of transmitting the control information and the data in a fixed manner. After receiving the first indication information, the second communications device may receive, based on the location relationship that is indicated by the first indication information and that is between the resource used to send the control information and the resource used to send the data, the control information and the data sent by the first communications device, thereby improving flexibility of sending the control information and the data by the first communications device.

In a possible design, the receiving, by a second communications device, first indication information from a first communications device on a first resource includes: receiving, by the second communications device, the first indication information from the first communications device on a second resource included in the first resource, where the second resource is a resource that is of the first resource and that includes a first decodable symbol in time domain and a resource block RB with a smallest sequence number in frequency domain.

In a possible design, the first resource includes m symbols in time domain and p RBs in frequency domain, where m or p is a positive integer; and the second resource is the first decodable symbol in the m symbols in time domain, and the second resource is an RB with a smallest sequence number in the p RBs in frequency domain.

In a possible design, the first indication information indicates that the location relationship between the resource on which the first communications device sends the control information and the resource on which the first communications device sends the data is the frequency division multiplexing relationship; the receiving, by the second communications device, the control information from the first communications device on the first resource includes: receiving, by the second communications device, the control information from the first communications device on q RBs in the p RBs, where q is a positive integer; and the receiving, by the second communications device based on the control information, the data from the first communications device on the first resource includes: receiving, by the second communications device based on the control information, the data from the first communications device on remaining p-q RBs in the p RBs.

In a possible design, the q RBs are two RBs with smallest sequence numbers in the p RBs.

In a possible design, the first indication information indicates that the location relationship between the resource on which the first communications device sends the control information and the resource on which the first communications device sends the data is the time division multiplexing relationship; the receiving, by the second communications device, the control information from the first communications device on the first resource includes: receiving, by the second communications device, the control information from the first communications device on first r symbols in the m symbols, where r is a positive integer; and the receiving, by the second communications device based on the control information, the data from the first communications device on the first resource includes: receiving, by the second communications device based on the control information, the data from the second communications device on remaining m-r symbols in the m symbols.

In a possible design, the second communications device receives, based on the control information, the data from the second communications device on a first symbol set of the remaining m-r symbols in the m symbols, and the method further includes: sending, by the second communications device based on the control information, the acknowledgment information to the first communications device on a second symbol set of the remaining m-r symbols in the m symbols, where the first symbol set and the second symbol set do not include a same symbol.

In a possible design, there is a guard interval between the first symbol set and the second symbol set, and the guard interval includes at least one symbol in time domain.

In a possible design, the receiving, by the second communications device, the control information from the first communications device on first r symbols in the m symbols includes: receiving, by the second communications device, the control information from the first communications device on a symbol in the first r symbols except the first symbol of the first r symbols; and the method further includes: receiving, by the second communications device, automatic gain control AGC information from the first communications device on the first symbol of the first r symbols.

In a possible design, the first resource includes at least one first time-frequency resource element, the first time-frequency resource element includes the m symbols in time domain and n RBs in frequency domain, the first resource includes the m symbols in time domain, a quantity p of RBs included in the first resource in frequency domain is a positive integer multiple of n, and n is a positive integer.

According to a fourth aspect, a second communications device is provided, including: a receiving unit, configured to receive first indication information from a first communications device on a first resource, where the first indication information is used to indicate a location relationship between a resource on which the first communications device sends control information and a resource on which the first communications device sends data, and the location relationship is a frequency division multiplexing relationship or a time division multiplexing relationship, where the receiving unit is further configured to receive the control information from the first communications device on the first resource; and the receiving unit is further configured to receive the data from the second communications device on the first resource based on the control information, where the location relationship between the resource on which the first communications device sends the control information to the second communications device and the resource on which the first communications device sends the data to the second communications device based on the control information meets the location relationship indicated by the first indication information.

According to this embodiment of this application, the first communications device notifies, by using the first indication information, the second communications device of the location relationship between the resource used to send the control information and the resource used to send the data, instead of transmitting the control information and the data in a fixed manner. After receiving the first indication information, the second communications device may receive, based on the location relationship that is indicated by the first indication information and that is between the resource used to send the control information and the resource used to send the data, the control information and the data sent by the first communications device, thereby improving flexibility of sending the control information and the data by the first communications device.

In a possible design, the receiving, by a receiving unit, first indication information from a first communications device on a first resource includes: receiving, by the receiving unit, the first indication information from the first communications device on a second resource included in the first resource, where the second resource is a resource that is of the first resource and that includes a first decodable symbol in time domain and a resource block RB with a smallest sequence number in frequency domain.

In a possible design, the first resource includes m symbols in time domain and p RBs in frequency domain, where m or p is a positive integer; and the second resource is the first decodable symbol in the m symbols in time domain, and the second resource is an RB with a smallest sequence number in the p RBs in frequency domain.

In a possible design, the first indication information indicates that the location relationship between the resource on which the first communications device sends the control information and the resource on which the first communications device sends the data is the frequency division multiplexing relationship; the receiving, by the receiving unit, the control information from the first communications device on the first resource includes: receiving, by the receiving unit, the control information from the first communications device on q RBs in the p RBs, where q is a positive integer; and the receiving, by the receiving unit based on the control information, the data from the first communications device on the first resource includes: receiving, by receiving unit based on the control information, the data from the first communications device on remaining p-q RBs in the p RBs.

In a possible design, the q RBs are two RBs with smallest sequence numbers in the p RBs.

In a possible design, the first indication information indicates that the location relationship between the resource on which the first communications device sends the control information and the resource on which the first communications device sends the data is the time division multiplexing relationship; the receiving, by the receiving unit, the control information from the first communications device on the first resource includes: receiving, by the receiving unit, the control information from the first communications device on first r symbols in the m symbols, where r is a positive integer; and the receiving, by the receiving unit based on the control information, the data from the first communications device on the first resource includes: receiving, by the receiving unit based on the control information, the data from the second communications device on remaining m-r symbols in the m symbols.

In a possible design, the receiving unit receives, based on the control information, the data from the second communications device on a first symbol set of the remaining m-r symbols in the m symbols; and the second communications device further includes a sending unit, and the sending unit is configured to send, based on the control information, the acknowledgment information to the first communications device on a second symbol set of the remaining m-r symbols in the m symbols, where the first symbol set and the second symbol set do not include a same symbol.

In a possible design, there is a guard interval between the first symbol set and the second symbol set, and the guard interval includes at least one symbol in time domain.

In a possible design, the receiving, by the receiving unit, the control information from the first communications device on first r symbols in the m symbols includes: receiving, by the receiving unit, the control information from the first communications device on a symbol in the first r symbols except the first symbol of the first r symbols; and the receiving unit is further configured to receive automatic gain control AGC information from the first communications device on the first symbol of the first r symbols.

In a possible design, the first resource includes at least one first time-frequency resource element, the first time-frequency resource element includes the m symbols in time domain and n RBs in frequency domain, the first resource includes the m symbols in time domain, a quantity p of RBs included in the first resource in frequency domain is a positive integer multiple of n, and n is a positive integer.

According to a fifth aspect, an embodiment of this application provides a computer-readable storage medium. The computer-readable storage medium stores an instruction. When run on a computer, the instruction enables the computer to perform the methods according to the foregoing aspects.

According to a sixth aspect, an embodiment of this application provides a computer program product. The program product stores a computer software instruction used by the foregoing first communications device or the second communications device, and the computer software instruction includes a program used to perform the solutions in the foregoing aspects.

According to a seventh aspect, an embodiment of this application provides a chip, configured to perform the methods in the foregoing aspects. The chip may include a part having functions of a memory, a processor, a transmitter, a receiver, and/or a transceiver. The memory stores an instruction, code, and/or data, used to perform the methods in the foregoing aspects.

According to an eighth aspect, an embodiment of this application provides a system. The system includes the network device, the first communications device, and/or the second communications device in the foregoing aspects.

DESCRIPTION OF EMBODIMENTS

Figure 1:
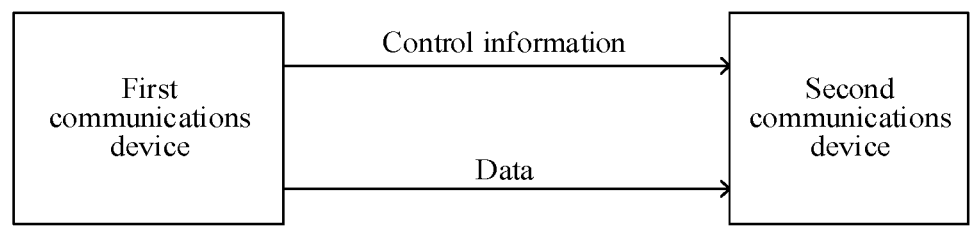
FIG. 1 is a schematic architectural diagram of a system according to an embodiment of this application.

In FIG. 1, a first communications device sends control information to a second communications device. The control information may be sidelink assignment (SA) information. The control information is used to indicate a time-frequency resource, a modulation and coding format, a data packet size, and other information about data sent by the first communications device to the second communications device. The second communications device receives the control information, and then decodes, based on the control information, the received data. A resource on which the first communications device sends the control information to the second communications device and a resource on which the first communications device sends the data to the second communications device may be configured by a network device, or may be selected autonomously by the first communications device from a V2X resource pool.

The network device in this application is an apparatus that is deployed in a radio access network and that is configured to provide a wireless communication function for the first or second communications device. The network device may be a network device or a base station (BS) in various forms, such as a macro base station, a micro base station, a relay station, or an access point. In systems using different radio access technologies, devices having a function of the network device may have different names. For example, the device is a network device or a base station in a fifth-generation 5G network. In a long term evolution (LTE) network, the device is referred to as an evolved NodeB (eNB or eNodeB for short). In a third-generation 3G network, the device is referred to as a NodeB or the like, or the device may be a road side unit (RSU) in V2X communication, or the device may be a chip or a system on chip (SOC) in the network device or the base station. For ease of description, in this application, the foregoing apparatuses providing a wireless communication function for the foregoing first or second communications device are collectively referred to as network devices.

The first or second communications device in this application may include various devices having a wireless communication function, or chips or SOCs in the devices. The device having the wireless communication function may be, for example, an in-vehicle device, a wearable device, a computing device, or another processing device connected to a wireless modem, a mobile station (MS), a terminal, or user equipment (UE). For ease of description, in this application, the devices mentioned above are collectively referred to as the first or second communications device.

More detailed descriptions of the embodiments of this application are provided below with reference to specific examples by using the first communications device, the second communications device, and the network device as examples.

Figure 2:
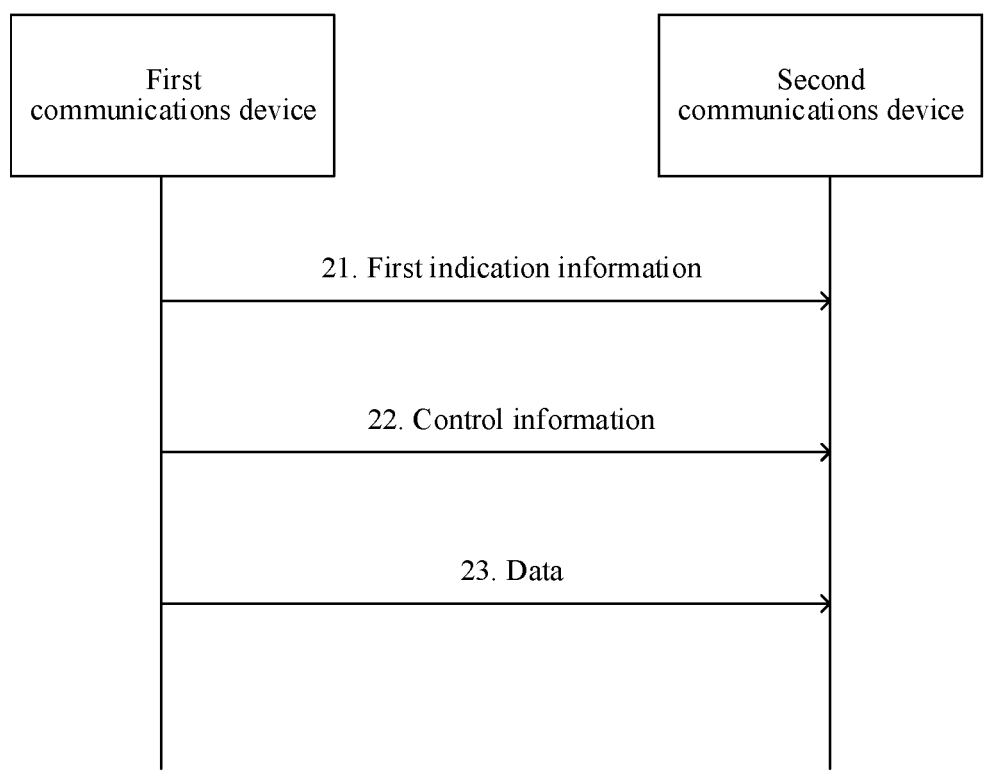
FIG. 2 shows a data transmission method, a first communications device, a second communications device, and a network device according to an embodiment of this application.
Figure 9:
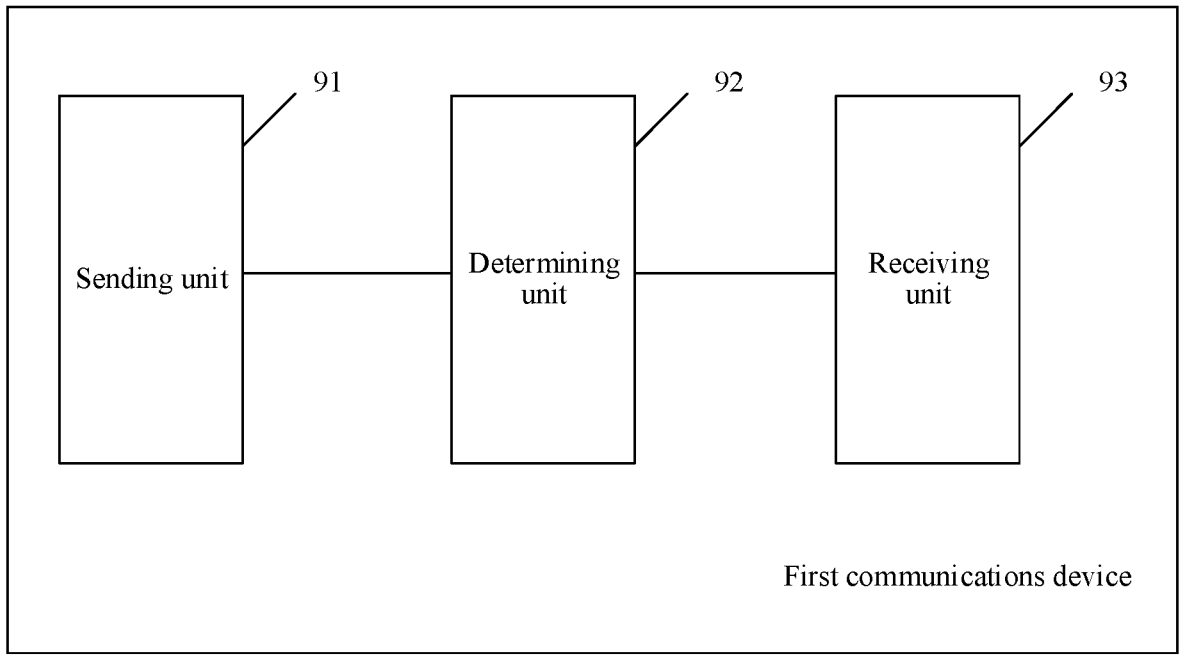
FIG. 9 shows a first communications device according to an embodiment of this application.
Figure 10:
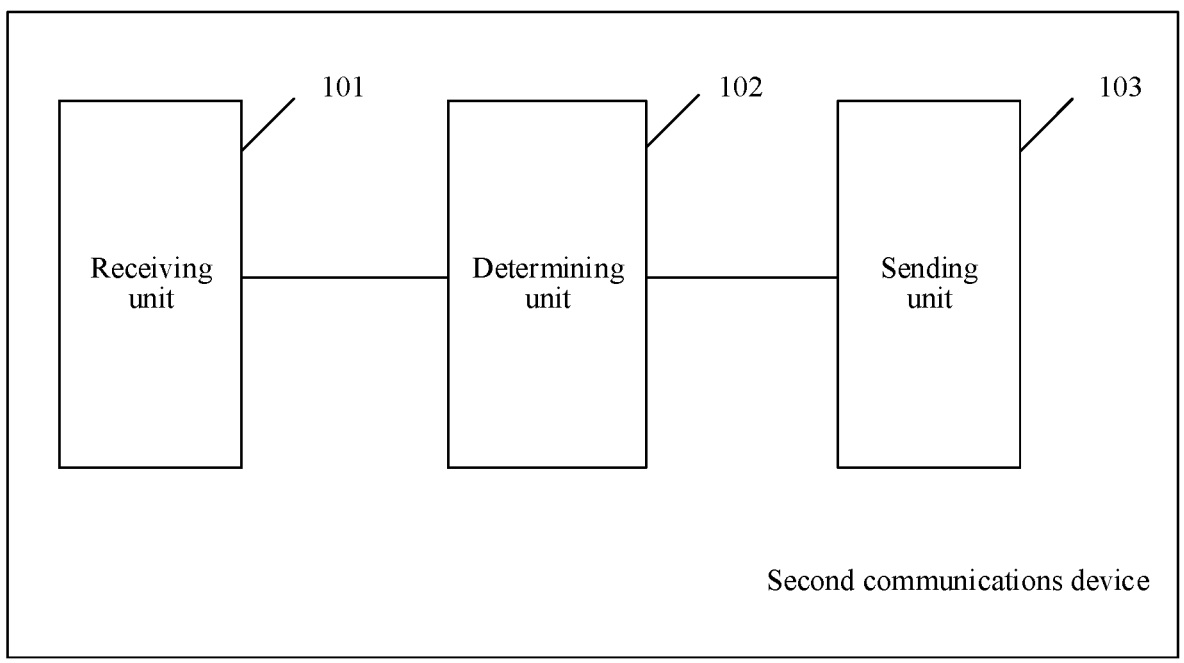
FIG. 10 shows a second communications device according to an embodiment of this application.
Figure 11:
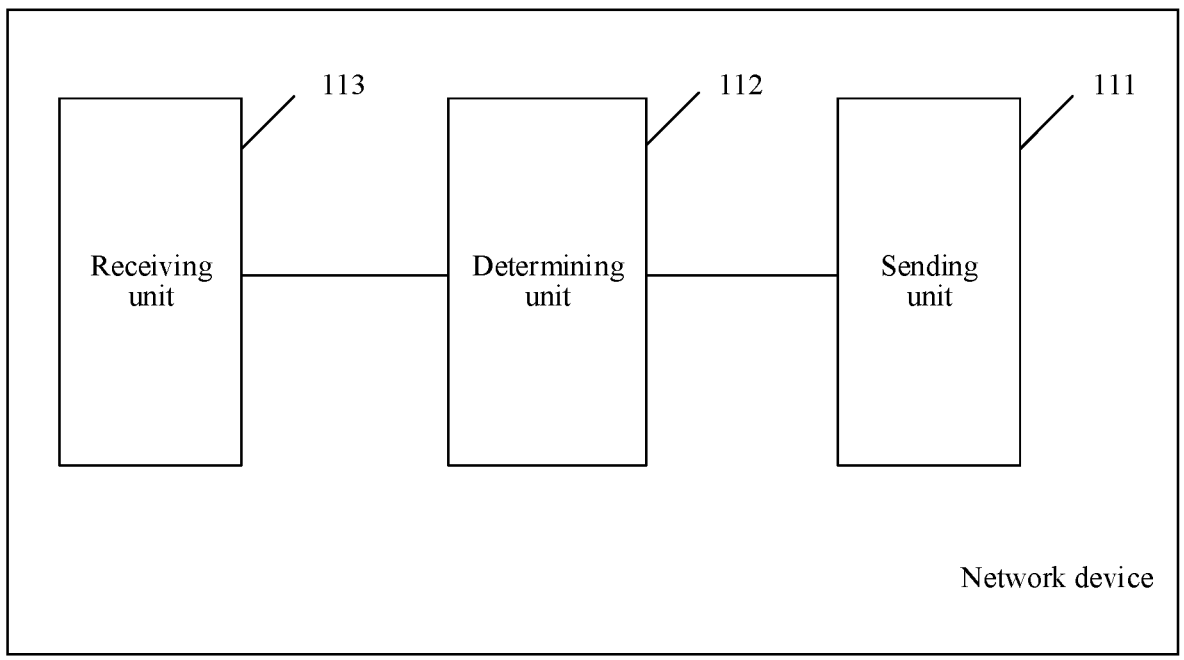
FIG. 11 shows a network device according to an embodiment of this application.

FIG. 2 shows an uplink information transmission method, a first communications device, a second communications device, a network device, and a system according to an embodiment of this application. As shown in FIG. 9, the first communications device includes a sending unit 91, a determining unit 92, and a receiving unit 93. The sending unit 91 and the receiving unit 93 may be replaced with a transceiver unit. As shown in FIG. 10, the second communications device includes a receiving unit 101, a determining unit 102, and a sending unit 103. The receiving unit 101 and the sending unit 103 may be replaced with a transceiver unit. As shown in FIG. 11, the network device includes a sending unit 111, a determining unit 112, and a receiving unit 113. The sending unit 111 and the receiving unit 113 may be replaced with a transceiver unit.

When the first or second communications device is a terminal device or user equipment, and the network device is a base station, the determining unit 92, the determining unit 102, or the determining unit 112 may be a processor, the sending unit 91, the sending unit 103, the sending unit 111, the receiving unit 93, the receiving unit 101, the receiving unit 113, or the transceiver unit may be a transceiver, the sending unit 91, the sending unit 103, or the sending unit 111 may be a transmitter, and the receiving unit 93, the receiving unit 101, or the receiving unit 113 may be a receiver, where the transceiver, the transmitter, or the receiver may be a radio frequency circuit. When the first or second communications device or the network device includes a storage unit, the storage unit is configured to store a computer instruction. The processor is communicatively connected to the memory. The processor executes the computer instruction stored in the memory, so that the first communications device, the second communications device, or the network device is enabled to perform the method in the embodiment in FIG. 2. The processor may be a general-purpose central processing unit (CPU), a microprocessor, or an application-specific integrated circuit (ASIC).

When the first communications device, the second communications device, or the network device is a chip, the determining unit 92, the determining unit 102, or the determining unit 112 may be, for example, a processor, the sending unit 91, the sending unit 103, or the sending unit 111 may be an output interface, a pin, a circuit, or the like, the receiving unit 93, the receiving unit 101, or the receiving unit 113 may be an input interface, a pin, a circuit, or the like, and the transceiver unit may be, for example, an input/output interface, a pin, or a circuit. The processing unit may execute the computer-executable instruction stored in the storage unit, so that the chip in the first communications device or the second communications device is enabled to perform the method in FIG. 2. Optionally, the storage unit is a storage unit in the chip, for example, a register or a cache; or the storage unit may be a storage unit that is in the terminal and that is located outside the chip, for example, a read only memory (ROM), or another type of static storage device that can store static information and an instruction, or a random access memory (RAM).

Specific steps of the uplink information transmission method in the embodiment in FIG. 2 are as follows:

Step 21: The sending unit 91 of the first communications device sends first indication information to the second communications device on a first resource, and the receiving unit 101 of the second communications device receives the first indication information from the first communications device on the first resource. The first indication information is used to indicate a location relationship between a resource on which the first communications device sends control information and a resource on which the first communications device sends data, and the location relationship is a frequency division multiplexing (FDM) relationship or a time division multiplexing (FDM) relationship. The first communications device sends the control information and the data to the second communications device on the first resource. Optionally, the first indication information is used to indicate one of the following: the resource on which the first communications device sends the control information and the resource on which the first communications device sends the data meet the frequency division multiplexing relationship, or the resource on which the first communications device sends the control information and the resource on which the first communications device sends the data meet the time division multiplexing relationship. Optionally, if the first communications device does not send the first indication information to the second communications device or the second communications device does not receive the first indication information from the first communications device, the first communications device sends the control information and the data to the second communications device based on the FDM location relationship by default, and/or the second communications device receives the control information and the data from the first communications device based on the FDM location relationship by default.

The sending, by the first communications device, the first indication information to the second communications device on the first resource includes: sending, by the first communications device, the first indication information to the second communications device on a second resource included in the first resource, where the second resource is a resource that is of the first resource and that includes a first decodable symbol in time domain and a resource block RB with a smallest sequence number in frequency domain.

A first time-frequency resource element is defined. The first time-frequency resource element includes m symbols in time domain and n resource blocks (RB) in frequency domain. The first time-frequency resource element is a minimum time-frequency resource element for completing V2X communication, that is, a time-frequency resource used to transmit V2X control information and V2X data is a positive integer multiple of the first time-frequency resource element. For example, in time domain, the first time-frequency resource element may be a subframe, a slot, or a mini slot. One slot includes 14 symbols or 12 symbols, and a quantity of symbols included in one mini slot is less than a quantity of symbols included in one slot. For example, one mini slot includes seven symbols or six symbols. In frequency domain, the first time-frequency resource element includes n consecutive RBs. The first resource includes at least one first time-frequency resource element. For example, the first resource includes the m symbols in time domain, the first resource includes p RBs in frequency domain, and p is a positive integer multiple of n. To be specific, the first resource includes at least one first time-frequency resource element in frequency domain, and includes only one first time-frequency resource element in time domain, where m, n, and p are all positive integers.

The sending, by sending unit 91 of the first communications device, the first indication information to the second communications device on the first resource includes: sending, by the sending unit 91 of the first communications device, the first indication information to the second communications device on the second resource, where in time domain, the second resource is the first decodable symbol in the m symbols included in the first resource in time domain, and in frequency domain, the second resource is an RB with a smallest sequence number in the p RBs included in the first resource in frequency domain. Therefore, the second communications device receives the first indication information from the first communications device at a resource location on which decoding may be first performed, so that the first indication information can be decoded as early as possible.

Because the resources on which the first communications device sends the control information and the data to the second communications device may meet the frequency division multiplexing location relationship, or may meet the time division multiplexing location relationship, the second communications device needs to learn, before decoding the control information and the data, whether the location relationship between the resource used to send the control information and the resource used to send the data is the frequency division multiplexing relationship or the time division multiplexing relationship. Therefore, optionally, a common control region (CCR) is defined on the first resource. The common control region is first x symbols in the m symbols included in the first resource, and is first y RBs with smallest sequence numbers in the p RBs included in the first resource, where x and y are positive integers. In this case, the first indication information may be transmitted on any resource block in the common control region, or may be transmitted on the first decodable symbol and an RB with a smallest sequence number that are in the common control region. The first decodable symbol may be the first symbol in the m symbols or in the x symbols. The first decodable symbol may alternatively be the second symbol in the m symbols or in the x symbols. In this case, the first symbol in the m symbols or in the x symbols may be used to transmit automatic gain control (AGC) information.

The first indication information may be SA type indicator (STI) information, and the first indication information may be represented by one bit. For example, "1" indicates that the location relationship between the resource used to transmit the control information and the resource used to transmit the data is in an FDM form, and "0" indicates that the location relationship between the resource used to transmit the control information and the resource used to transmit the data is in a TDM form, or vice versa. The first indication information may be encoded by using an encoder with a code rate of k to form a 1/k-bit code word, and then modulated to form z symbols, where z is a positive integer, and the modulation may be, for example, binary phase shift keying (BPSK) modulation, quadrature phase shift keying (QPSK) modulation, 16 quadrature amplitude modulation (16QAM), 64 quadrature amplitude modulation (64QAM), or 256 quadrature amplitude modulation (256QAM). Optionally, before the modulation, the 1/k-bit code word may further be scrambled. Subsequently, the modulated z symbols may be evenly mapped to a plurality of resource elements (RE) included in the RB of the resource used to transmit the first indication information.

Step 22: The sending unit 91 of the first communications device sends the control information to the second communications device on the first resource, and the receiving unit 101 of the second communications device receives the control information from the first communications device on the first resource. The control information may be SA information, and the control information may be transmitted on a physical sidelink control channel (PSCCH).

Step 23: The sending unit 91 of the first communications device sends the data to the second communications device on the first resource based on the control information, where the data may be transmitted on a physical sidelink shared channel (PSSCH), and the receiving unit 101 of the second communications device receives the data from the second communications device on the first resource based on the control information. The location relationship between the resource on which the first communications device sends the control information to the second communications device and the resource on which the first communications device sends the data to the second communications device based on the control information meets the location relationship indicated by the first indication information. For example, if the first indication information indicates that the location relationship between the resource on which the first communications device sends the control information and the resource on which the first communications device sends the data is in the FDM form, after receiving the first indication information, the second communications device may learn that the resources on which the first communications device sends the control information and the data are in the FDM form; or if the first indication information indicates that the location relationship between the resource on which the first communications device sends the control information and the resource on which the first communications device sends the data is in the TDM form, after receiving the first indication information, the second communications device may learn that the resources on which the first communications device sends the control information and the data are in the TDM form.

According to this embodiment of this application, the first communications device notifies, by using the first indication information, the second communications device of the location relationship between the resource used to send the control information and the resource used to send the data, instead of transmitting the control information and the data in a fixed manner. After receiving the first indication information, the second communications device may receive, based on the location relationship that is indicated by the first indication information and that is between the resource used to send the control information and the resource used to send the data, the control information and the data sent by the first communications device, thereby improving flexibility of sending the control information and the data by the first communications device.

The first communications device may determine, based on information such as a service type, a data packet size, and/or a latency requirement that are of the to-be-sent data, whether the to-be-sent control information and the to-be-sent data are transmitted in the FDM form or the TDM form, and notify the second communications device by using the first indication information. Whether the first communications device transmits the to-be-sent control information and the to-be-sent data in the FDM form or the TDM form may alternatively be determined by the determining unit 112 of the network device, sent to the first communications device by using the sending unit 111, and then notified to the second communications device by the first communications device by using the first indication information, or certainly, may be notified to the first communications device and the second communications device by the sending unit 111 of the base station. Therefore, the FDM form or the TDM form may be used to transmit the control information or the data based on a requirement of a specific data service, thereby improving flexibility of V2X information transmission.

Figure 3:
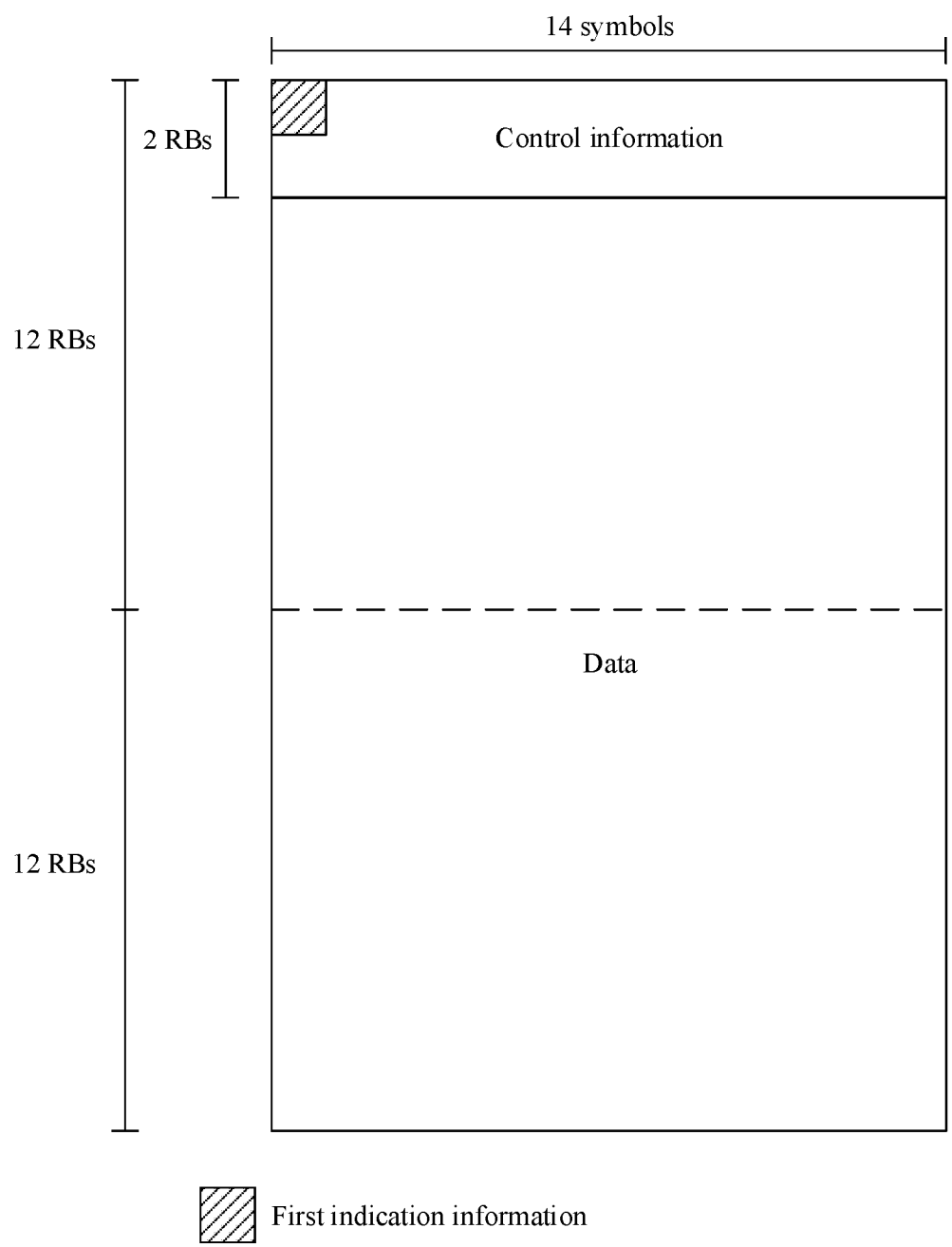
FIG. 3 is a schematic diagram of a data transmission resource according to an embodiment of this application.

If the first indication information indicates that the location relationship between the resource on which the first communications device sends the control information and the resource on which the first communications device sends the data is the frequency division multiplexing relationship, the sending, by the sending unit 91 of the first communications device, the control information to the second communications device on the first resource includes: sending, by the sending unit 91 of the first communications device, the control information to the second communications device on q RBs in the p RBs, where q is a positive integer; and the sending, by the first communications device based on the control information, the data to the second communications device on the first resource includes: sending, by the first communications device based on the control information, the data to the second communications device on remaining p-q RBs in the p RBs. For example, as shown in FIG. 3, the first resource includes two first time-frequency resource elements. The first time-frequency resource element includes one slot, for example, 14 symbols, and includes 12 RBs. Therefore, m is 14, n is 12, p is 24, and q is 2. In this case, the first resource includes 14 symbols and 24 RBs. The first indication information is sent by the first communications device to the second communications device on the first symbol and the first RB of the first resource. The first communications device sends the control information to the second communications device on a time-frequency resource including all the 14 symbols and two RBs with smallest sequence numbers in the 24 RBs included in the first resource, and the first communications device sends the data to the second communications device on a time-frequency resource including all 14 symbols and 22 RBs in the 24 RBs included in the first resource except the two RBs with the smallest sequence numbers. Certainly, the first resource may alternatively include only one first time-frequency resource element.

When the location relationship between the resource on which the first communications device sends the control information and the resource on which the first communications device sends the data is the frequency division multiplexing FDM relationship, the second communications device needs to buffer the control information and buffer the data. The second communications device needs 14 symbols to receive all the control information. Subsequently, the second communications device decodes the control information, and then decodes the buffered data based on decoded control information. Because the second communications device needs to buffer the control information and the data before decoding the control information and the data, transmission of the control information and the data in the FDM form is applicable to transmission of a data service that does not have a high requirement on a latency.

Figure 4:
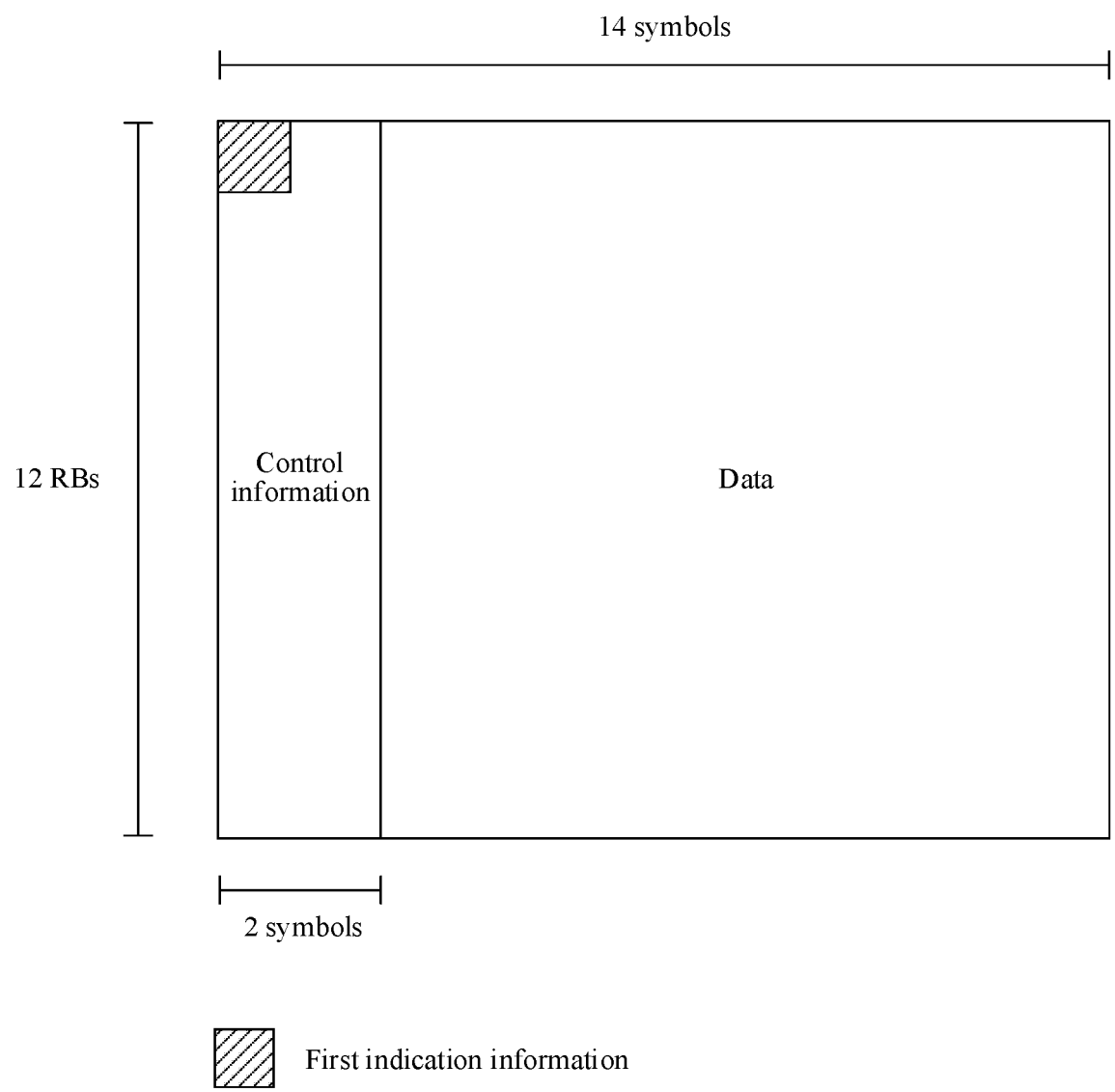
FIG. 4 is a schematic diagram of a data transmission resource according to an embodiment of this application.

If the first indication information indicates that the location relationship between the resource on which the first communications device sends the control information and the resource on which the first communications device sends the data is the time division multiplexing relationship, the sending, by the sending unit 91 of the first communications device, the control information to the second communications device on the first resource includes: sending, by the sending unit 91 of the first communications device, the control information to the second communications device on first r symbols in the m symbols, where r is a positive integer; and the sending, by the first communications device based on the control information, the data to the second communications device on the first resource includes: sending, by the first communications device based on the control information, the data to the second communications device on remaining m-r symbols in the m symbols. For example, as shown in FIG. 4, the first resource includes one first time-frequency resource element. The first time-frequency resource element includes one slot, for example, 14 symbols, and includes 12 RBs. Therefore, m is 14, n is 12, p is 12, and r is 2. In this case, the first resource includes 14 symbols and 12 RBs, and the first indication information is sent by the first communications device to the second communications device on the first symbol and the first RB of the first resource. The sending unit 91 of the first communications device sends the control information to the second communications device on first two symbols in the 14 symbols, and the first communications device sends, based on the control information, the data to the second communications device on remaining 12 symbols in the 14 symbols.

Figure 5:
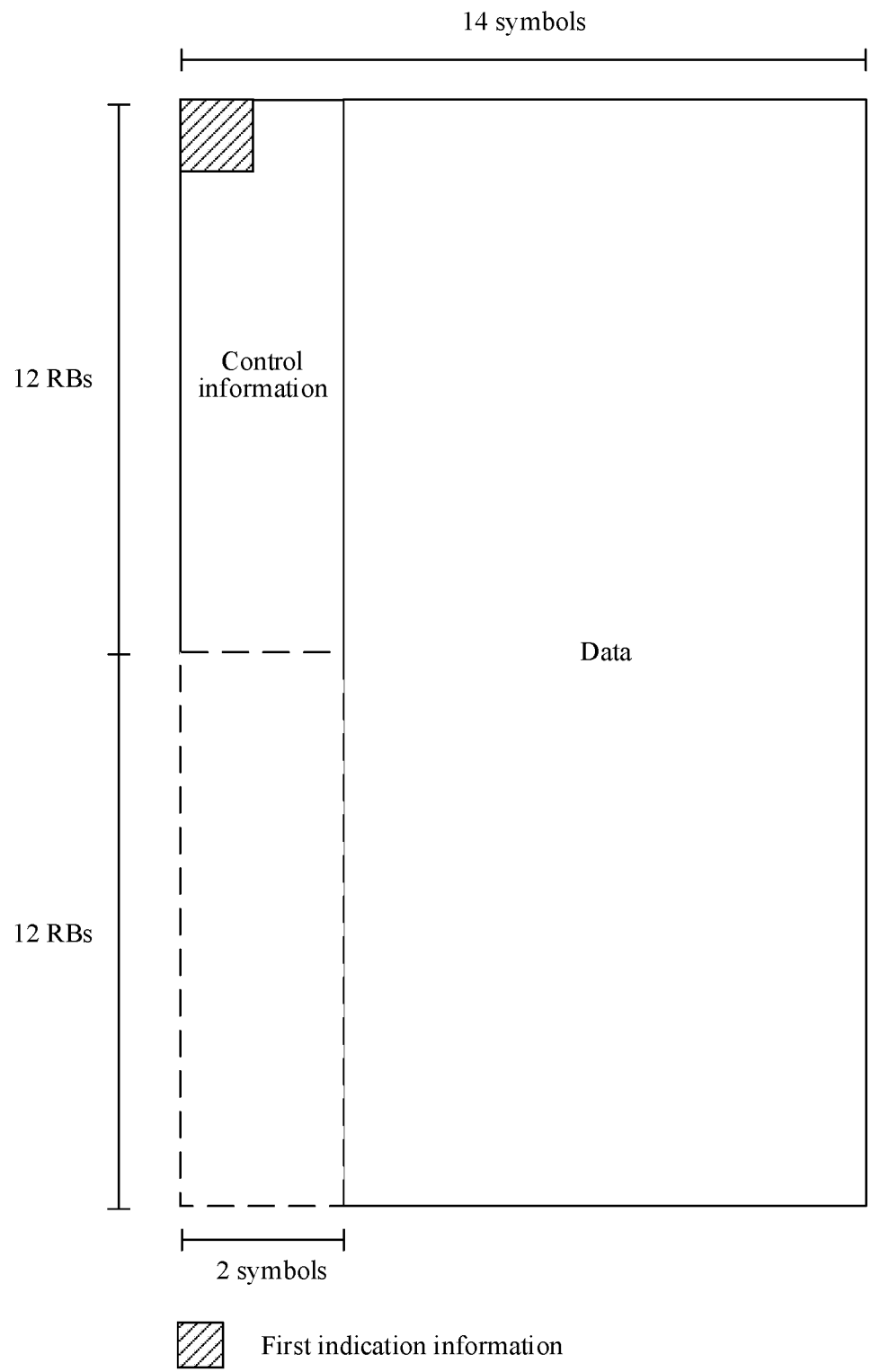
FIG. 5 is a schematic diagram of a data transmission resource according to an embodiment of this application.

For another example, as shown in FIG. 5, the first resource includes two first time-frequency resource elements. The first time-frequency resource element includes one slot, for example, 14 symbols, and includes 12 RBs. Therefore, m is 14, n is 12, p is 24, and r is 2. In this case, the first resource includes 14 symbols and 24 RBs, and the first indication information is sent by the first communications device to the second communications device on the first symbol and the first RB of the first resource. The sending unit 91 of the first communications device sends the control information to the second communications device on a time-frequency resource including first two symbols in the 14 symbols and first 12 RBs. Certainly, alternatively, the control information may be sent to the second communications device on a time-frequency resource including the first two symbols in the 14 symbols and all the 24 RBs. The first communications device sends, based on the control information, the data to the second communications device on a time-frequency resource including remaining 12 symbols in the 14 symbols and all the 24 symbols.

When the location relationship between the resource on which the first communications device sends the control information and the resource on which the first communications device sends the data is the time division multiplexing TDM relationship, the second communications device can receive all the control information by using only two symbols, and then the second communications device can receive the data based on the received control information. Because the control information and the data are transmitted in sequence in time domain, the second communications device can receive the control information in a time of only two symbols, and then can decode the data. Therefore, transmission of the control information and the data in the TDM form is applicable to transmission of a data service that has a high requirement on a latency.

Figure 6:
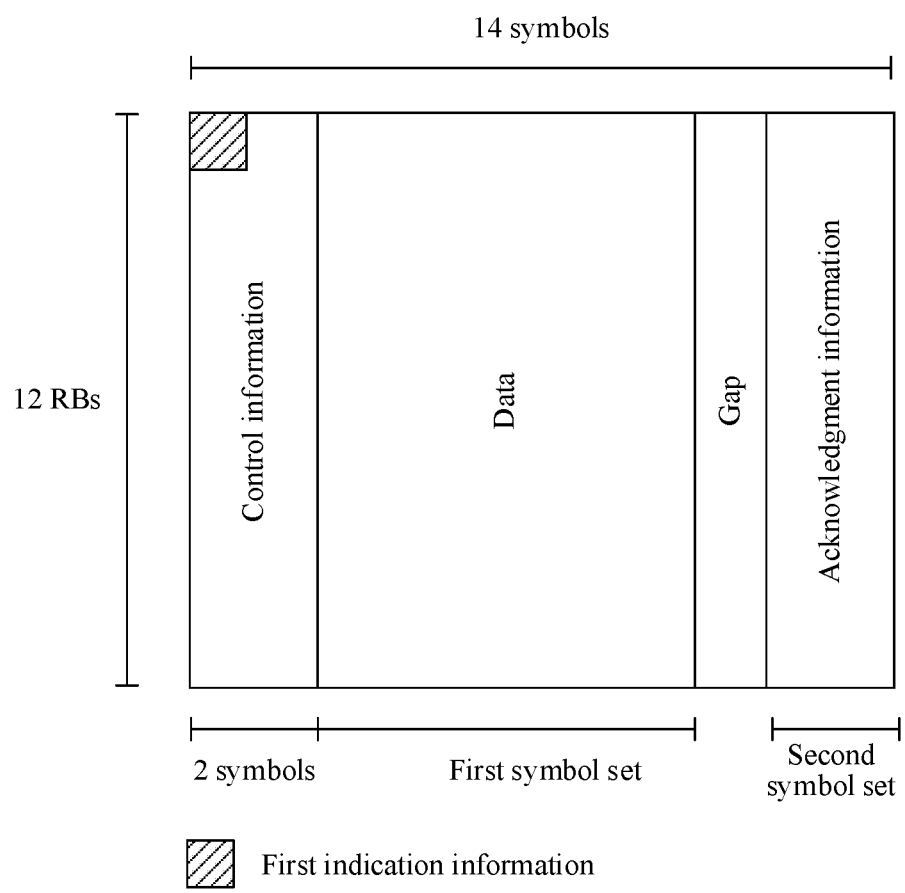
FIG. 6 is a schematic diagram of a data transmission resource according to an embodiment of this application.

The first communications device may further receive acknowledgment information from the second communications device. The acknowledgment information is used by the second communications device to feedback, to the first communications device, whether the data sent by the first communications device is correctly received. The acknowledgment information includes acknowledgment (ACK) information or negative acknowledgment (NACK) information. Based on the embodiment in FIG. 4, transmission of the acknowledgment information, for example, is shown in FIG. 6. The sending unit 91 of the first communications device sends, based on the control information, the data to the second communications device on a first symbol set of the remaining m-r symbols in the m symbols, and the receiving unit 93 of the first communications device receives, based on the control information, the acknowledgment information from the second communications device on a second symbol set of the remaining m-r symbols in the m symbols, where the first symbol set and the second symbol set do not include a same symbol. As shown in FIG. 6, a guard interval Gap may be further set between the data and the acknowledgment information, and the guard interval occupies at least one symbol.

Figure 7:
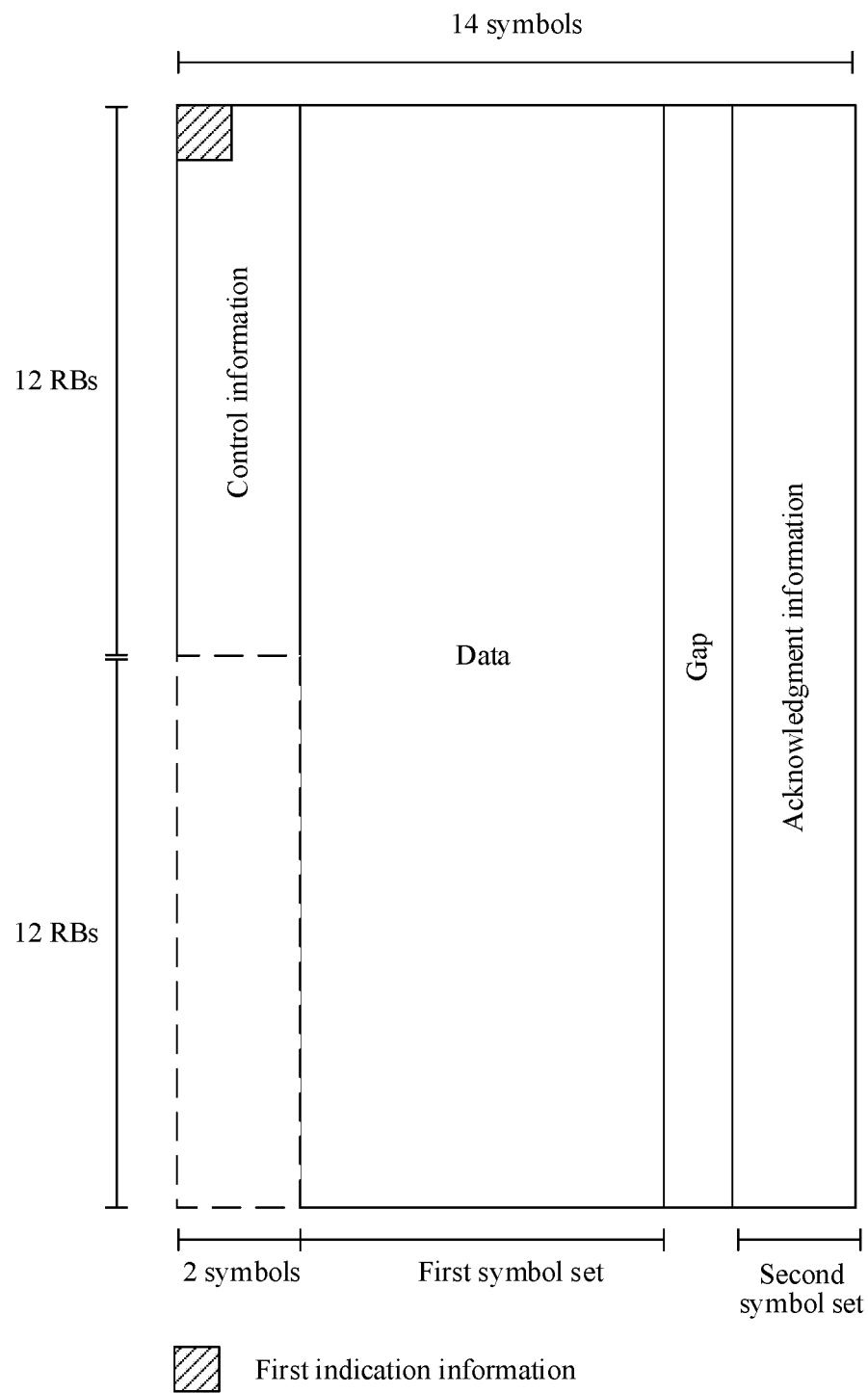
FIG. 7 is a schematic diagram of a data transmission resource according to an embodiment of this application.

Based on the embodiment in FIG. 5, transmission of the acknowledgment information, for example, is shown in FIG. 7. The sending unit 91 of the first communications device sends, based on the control information, the data to the second communications device on a first symbol set of the remaining m-r symbols in the m symbols, and the receiving unit 93 of the first communications device receives, based on the control information, the acknowledgment information from the second communications device on a second symbol set of the remaining m-r symbols in the m symbols, where the first symbol set and the second symbol set do not include a same symbol. As shown in FIG. 7, a guard interval Gap may be further set between the data and the acknowledgment information, and the guard interval occupies at least one symbol.

The sending, by the first communications device, the control information to the second communications device on the first r symbols in the m symbols includes: sending, by the sending unit 91 of the first communications device, the control information to the second communications device on a symbol in the first r symbols except the first symbol of the first r symbols; and sending, by the sending unit 91 of the first communications device, AGC information to the second communications device on the first symbol of the first r symbols.

The control information mentioned in the foregoing embodiments includes at least one of slot format indicator (SFI) information, cyclic prefix indication information, subcarrier spacing indication information, or slot indication information.

Figure 8:
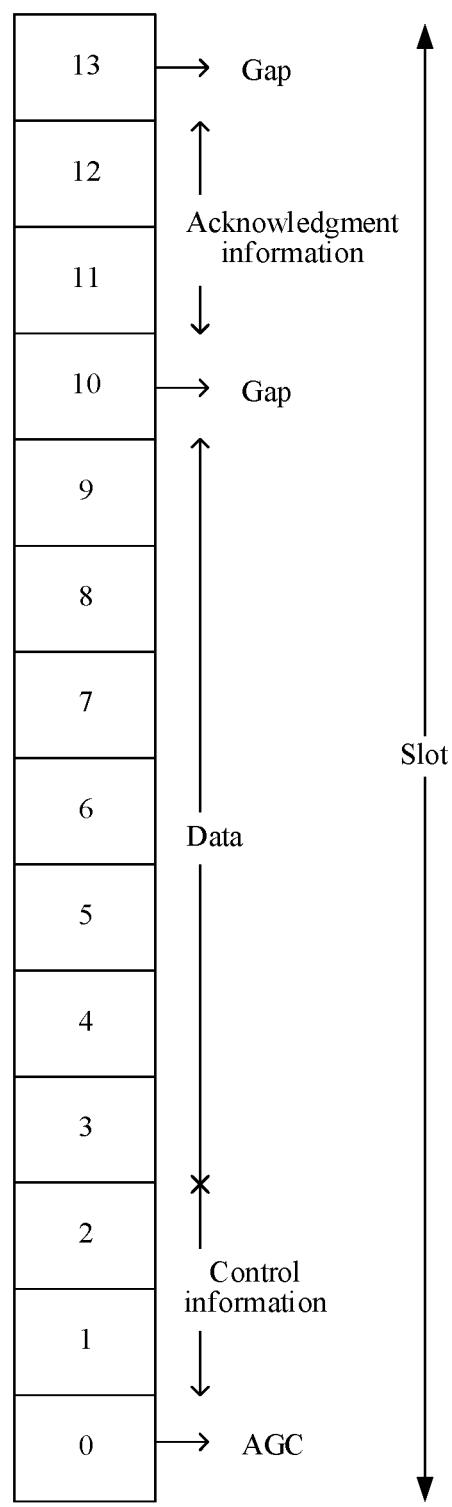
FIG. 8 is a schematic diagram of a data transmission resource according to an embodiment of this application.

The slot format indicator information is used to indicate at least one of a symbol used to transmit the control information, a symbol used to transmit the data, or a symbol used to transmit the acknowledgment information. In other words, the slot format indicator information indicates purposes of different symbols included in a slot in which the first resource is located. For example, as shown in FIG. 8, the slot format indicator information indicates that a symbol 0 is used for AGC, symbols 1 and 2 are used for transmission of the control information, symbols 3 to 9 are used for transmission of the data, symbols 10 and 13 are used for guard intervals, and symbols 11 and 12 are used for transmission of the acknowledgment information. The cyclic prefix indication information is used to indicate a type of a cyclic prefix. For example, the cyclic prefix may be a normal cyclic prefix or an extended cyclic prefix. The subcarrier spacing indication information is used to indicate a frequency spacing between neighboring subcarriers. The slot indication information is used to indicate that a smallest unit that is of the resource used to transmit the control information or the data and that is in time domain is a slot or a mini slot.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

What is claimed is:

1. A data sending method, comprising:
sending, by a first communications device, first indication information to a second communications device on a first resource, wherein the first indication information is used to indicate a location relationship between a resource on which the first communications device sends control information and a resource on which the first communications device sends data, and the location relationship is a frequency division multiplexing relationship or a time division multiplexing relationship;
sending, by the first communications device, the control information to the second communications device on the first resource; and
sending, by the first communications device based on the control information, the data to the second communications device on the first resource, wherein the location relationship between the resource on which the first communications device sends the control information to the second communications device and the resource on which the first communications device sends the data to the second communications device based on the control information meets the location relationship indicated by the first indication information,
wherein the sending, by the first communications device, the first indication information to the second communications device on the first resource comprises: sending, by the first communications device, the first indication information to the second communications device on a second resource comprised in the first resource, wherein the second resource is a resource that is of the first resource and that consists of a first decodable symbol in a time domain and a resource block (RB) with a smallest sequence number in a frequency domain.

2. The method according to claim 1, wherein:
the first resource comprises m symbols in the time domain and p RBs in the frequency domain, wherein m or p is a positive integer; and
the second resource is the first decodable symbol in the m symbols in the time domain, and the second resource is an RB with a smallest sequence number in the p RBs in the frequency domain.

3. The method according to claim 2, wherein:
the first indication information indicates that the location relationship between the resource on which the first communications device sends the control information and the resource on which the first communications device sends the data is the frequency division multiplexing relationship;
the sending, by the first communications device, the control information to the second communications device on the first resource comprises: sending, by the first communications device, the control information to the second communications device on q RBs in the p RBs, wherein q is a positive integer; and
the sending, by the first communications device based on the control information, the data to the second communications device on the first resource comprises: sending, by the first communications device based on the control information, the data to the second communications device on remaining p-q RBs in the p RBs.

4. The method according to claim 3, wherein:
the q RBs are two RBs with sequence numbers that are the smallest two sequence numbers in the p RBs.

5. The method according to claim 2, wherein:
the first indication information indicates that the location relationship between the resource on which the first communications device sends the control information and the resource on which the first communications device sends the data is the time division multiplexing relationship;

the sending, by the first communications device, the control information to the second communications device on the first resource comprises: sending, by the first communications device, the control information to the second communications device on a first r symbols in a sequence of the m symbols in the time domain, wherein r is a positive integer; and the sending, by the first communications device based on the control information, the data to the second communications device on the first resource comprises: sending, by the first communications device based on the control information, the data to the second communications device on a remaining m-r symbols in the sequence of the m symbols in the time domain.

6. The method according to claim 5, wherein the first communications device sends, based on the control information, the data to the second communications device on a first symbol set of the remaining m-r symbols in the m symbols, and wherein the method further comprises:

receiving, by the first communications device based on the control information, acknowledgment information from the second communications device on a second symbol set of the remaining m-r symbols in the m symbols, wherein the first symbol set and the second symbol set do not comprise a same symbol.

7. The method according to claim 6, wherein there is a guard interval between the first symbol set and the second symbol set, and the guard interval comprises at least one symbol in the time domain.

8. The method according to claim 5, wherein:

the sending, by the first communications device, the control information to the second communications device on the first r symbols in the sequence of the m symbols in the time domain comprises: sending, by the first communications device, the control information to the second communications device on a symbol in the first r symbols, wherein the symbol in the first r symbols is not the first symbol of the first r symbols and r is greater than one; and the method further comprises: sending, by the first communications device, automatic gain control (AGC) information to the second communications device on the first symbol of the first r symbols.

9. The method according to claim 2, wherein:

the first resource comprises at least one first time-frequency resource element, the at least one first time-frequency resource element comprises the m symbols in the time domain and n RBs in the frequency domain, the first resource comprises the m symbols in the time domain, a quantity of the p RBs comprised in the first resource in the frequency domain is a positive integer multiple of n, and n is a positive integer.

10. A first communications device, comprising:

a processor; and a transceiver, configured to send first indication information to a second communications device on a first resource, wherein the first indication information is used to indicate a location relationship between a resource on which the first communications device sends control information and a resource on which the first communications device sends data, and the location relationship is a frequency division multiplexing relationship or a time division multiplexing relationship, wherein:

the transceiver is further configured to send the control information to the second communications device on the first resource;

the transceiver is further configured to send the data to the second communications device on the first resource based on the control information, wherein the location relationship between the resource on which the first communications device sends the control information to the second communications device and the resource on which the first communications device sends the data to the second communications device based on the control information meets the location relationship indicated by the first indication information, and the sending, by the transceiver, the first indication information to the second communications device on the first resource comprises: sending, by the transceiver, the first indication information to the second communications device on a second resource comprised in the first resource, wherein the second resource is a resource that is of the first resource and that consists of a first decodable symbol in a time domain and a resource block (RB) with a smallest sequence number in a frequency domain.

11. The first communications device according to claim 10, wherein:

the first resource comprises m symbols in the time domain and p RBs in the frequency domain, wherein m or p is a positive integer; and the second resource is the first decodable symbol in the m symbols in the time domain, and the second resource is an RB with a smallest sequence number in the p RBs in the frequency domain.

12. The first communications device according to claim 11, wherein:

the first indication information indicates that the location relationship between the resource on which the transceiver sends the control information and the resource on which the transceiver sends the data is the frequency division multiplexing relationship;

the sending, by the transceiver, the control information to the second communications device on the first resource comprises: sending, by the transceiver, the control information to the second communications device on q RBs in the p RBs, wherein q is a positive integer; and the sending, by the transceiver based on the control information, the data to the second communications device on the first resource comprises: sending, by the transceiver based on the control information, the data to the second communications device on remaining p-q RBs in the p RBs.

13. The first communications device according to claim 12, wherein:

the q RBs are two RBs with sequence numbers that are the smallest two sequence numbers in the p RBs.

14. The first communications device according to claim 11, wherein:

the first indication information indicates that the location relationship between the resource on which the transceiver sends the control information and the resource on which the transceiver sends the data is the time division multiplexing relationship;

the sending, by the transceiver, the control information to the second communications device on the first resource comprises: sending, by the transceiver, the control information to the second communications device on a first r symbols in a sequence of the m symbols in the time domain, wherein r is a positive integer; and the sending, by the transceiver based on the control information, the data to the second communications device on the first resource comprises: sending, by the transceiver based on the control information, the data to the second communications device on a remaining m-r symbols in the sequence of the m symbols in the time domain.

15. The first communications device according to claim 14, wherein the transceiver sends, based on the control information, the data to the second communications device on a first symbol set of the remaining m-r symbols in the m symbols; and wherein the transceiver is further configured to receive based on the control information, acknowledgment information from the second communications device on a second symbol set of the remaining m-r symbols in the m symbols, wherein the first symbol set and the second symbol set do not comprise a same symbol.

16. The first communications device according to claim 15, wherein there is a guard interval between the first symbol set and the second symbol set, and the guard interval comprises at least one symbol in the time domain.

17. The first communications device according to claim 14, wherein:

the sending, by the transceiver, the control information to the second communications device on the first r symbols in the sequence of the m symbols in the time domain comprises: sending, by the transceiver, the control information to the second communications device on a symbol in the first r symbols, wherein the symbol in the first r symbols is not the first symbol of the first r symbols and r is greater than one; and the transceiver is further configured to send automatic gain control (AGC) information to the second communications device on the first symbol of the first r symbols.

18. The first communications device according to claim 11, wherein:

the first resource comprises at least one first time-frequency resource element, the at least one first time-frequency resource element comprises the m symbols in the time domain and n RBs in the frequency domain, the first resource comprises the m symbols in the time domain, a quantity of the p RBs comprised in the first resource in the frequency domain is a positive integer multiple of n, and n is a positive integer.

* * * * *

UNITED STATES PATENT AND TRADEMARK OFFICE
CERTIFICATE OF CORRECTION

| | |
|---|---|
| PATENT NO. | : 11,375,479 B2 |
| APPLICATION NO. | : 16/914113 |
| DATED | : June 28, 2022 |
| INVENTOR(S) | : Su et al. |

It is certified that error appears in the above-identified patent and that said Letters Patent is hereby corrected as shown below:

In the Claims

Claim 10: Column 20, Line 10: "indicated by the first indication information, and" should read -- indicated by the first indication information; and --.

Signed and Sealed this
First Day of November, 2022

Katherine Kelly Vidal
*Director of the United States Patent and Trademark Office*